US006996655B1

(12) United States Patent
Lee et al.

(10) Patent No.: US 6,996,655 B1
(45) Date of Patent: Feb. 7, 2006

(54) EFFICIENT PEER-TO-PEER DMA

(75) Inventors: R. Samuel Lee, Meridian, ID (US); James G. Eldredge, Meridian, ID (US)

(73) Assignee: Cypress Semiconductor Corp., San Jose, CA (US)

( * ) Notice: Subject to any disclaimer, the term of this patent is extended or adjusted under 35 U.S.C. 154(b) by 775 days.

(21) Appl. No.: 10/028,029

(22) Filed: Dec. 21, 2001

(51) Int. Cl.
*G06F 13/00* (2006.01)
*G06F 12/00* (2006.01)

(52) U.S. Cl. .......................................... 710/308; 710/22
(58) Field of Classification Search ................ 710/22, 710/300, 308, 72, 74, 240, 241, 113; 711/100, 711/202; 709/208, 212
See application file for complete search history.

(56) References Cited

U.S. PATENT DOCUMENTS 5,586,291 A * 12/1996 Lasker et al. ............... 711/113
5,802,327 A * 9/1998 Hawley et al. ............. 710/300
5,926,629 A * 7/1999 Gulick ....................... 710/117
6,032,213 A * 2/2000 Gulick ....................... 710/312
6,044,414 A * 3/2000 Gulick ....................... 710/22
6,708,285 B2 * 3/2004 Oldfield et al. ............. 714/11
6,798,418 B1 * 9/2004 Sartori et al. ............... 345/519

OTHER PUBLICATIONS

"ASIC design in a next generation workstation" by Young, M.S. (abstract only) Publication Date: Sep. 17-21, 1990.*
"Design and verification of an embedded mocroprocessor" By Onufryk, P.Z. (abstract only) Publication date: Dec. 2-6, 1996.*

* cited by examiner

*Primary Examiner*—Gopal C. Ray
(74) *Attorney, Agent, or Firm*—Marger Johnson & McCollom P.C.

(57) ABSTRACT

Peer-to-peer Direct Memory Access (DMA) permits the efficient transfer of data from one DMA capable Application Specific Integrated Circuit (ASIC) block to another without accessing memory. The peer-to-peer transfer can be done over a standard AMBA AHB bus architecture without side band signals and without violating the AHB specification.

19 Claims, 2 Drawing Sheets

EFFICIENT PEER-TO-PEER DMA

BACKGROUND OF THE INVENTION

This invention relates generally to data transfer between Direct Memory Access (DMA) capable Application Specific Integrated Circuit (ASIC) blocks, and more particularly to data transfers between DMA capable ASIC blocks over an AHB bus.

SUMMARY OF THE INVENTION

Peer-to-peer Direct Memory Access (DMA) permits the efficient transfer of data from one DMA capable Application Specific Integrated Circuit (ASIC) block to another without accessing memory. The peer-to-peer transfer can be done over a standard AMBA AHB bus architecture without side band signals and without violating the AHB specification.

For example, in the peer-to-peer DMA of one embodiment, a bridge is used to map the target DMA's AHB master interface to the target's AHB slave interface. The initiating DMA is held off by the target DMA's slave interface using a split response, described in the AHB specification, until the target DMA is set up and ready to complete the transfer. In this configuration, the initiating ASIC block does not require any additional logic to perform the peer-to-peer transfer and the target DMA does not require an additional slave interface.

More particularly, the target DMA is set up as if it is going to perform a normal DMA in the opposite direction as the initiating DMA. Unlike a standard DMA, which uses only the master interface for a data transfer, the control signals and data signals for the target DMA block are routed to its slave interface using muxes. This internal interface between the target's DMA and slave interface transforms the target's slave interface into a slave-to-slave bridge. This is done so that both the initiator and target DMA blocks can operate as if they have access to the bus, even though only the initiator is actually being granted access from the system arbiter. The target's DMA just thinks it has access to the bus, but in reality has access to its slave interface via the slave-to-slave bridge.

BRIEF DESCRIPTION OF THE DRAWINGS

The foregoing and additional objects and advantages of the present invention will become more readily apparent from the following detailed description of preferred embodiments, made with reference to the accompanying drawings, in which.

DETAILED DESCRIPTION OF PREFERRED EMBODIMENT

The purpose of a peer-to-peer DMA is to efficiently transfer data between two DMA capable ASIC blocks without time-consuming memory accesses. The architecture described below is an efficient way to enable peer-to-peer data transfers over an AHB bus without the use of sideband signals or duplicate hardware for interfacing to the core blocks on the other side of the DMA ASIC blocks.

More particularly, the peer-to-peer DMA according to a preferred embodiment of this invention uses ARM's AMBA AHB bus architecture. The interface between the two DMA capable ASIC blocks is completely compliant with the AHB bus architecture and the ASIC blocks can be used to perform a standard DMA or a peer-to-peer DMA without violating the AHB specification.

Figure 1:
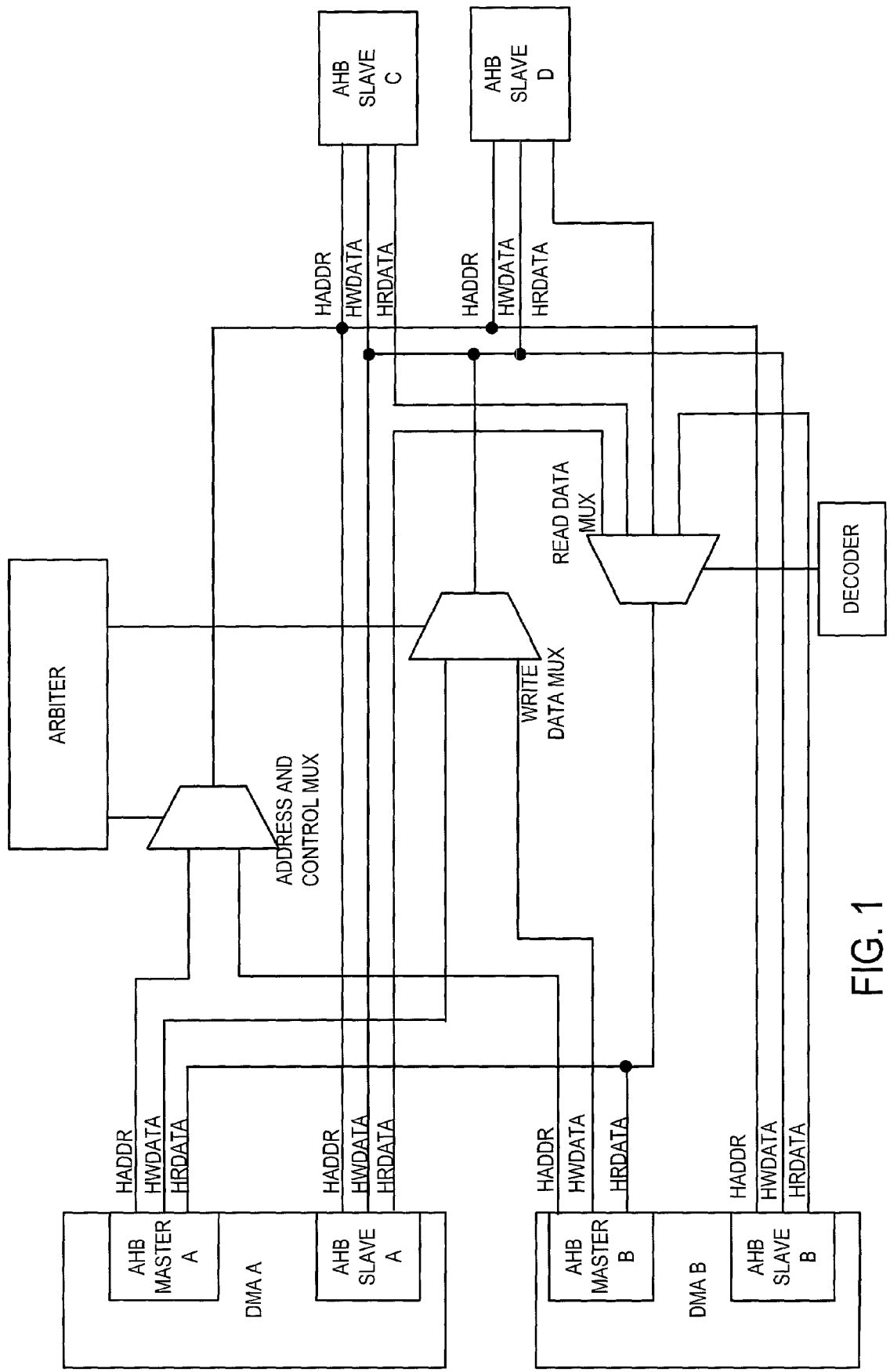
FIG. 1 is a schematic block diagram illustrating an AHB bus interconnection between two DMA capable ASIC blocks and two system slaves.

A block diagram showing a basic AMBA AHB bus interconnection between two DMA capable ASIC blocks and two system slaves is included as FIG. 1. Referring to FIG. 1, according to a preferred embodiment of the invention, each of the DMA ASIC blocks includes both a master interface and a slave interface and can operate as both a bus master and a slave. The slave interface is used by a processor or other system controller to read and write the registers that set up and run the DMA, while the master interface is used to initiate reads and writes to the system memory. In the peer-to-peer DMA of this embodiment, data is transferred to or from the initiating DMA ASIC block through its master interface. Data is transferred to or from the targeted DMA ASIC block through its slave-to-slave bridge which is internally connected to the target's DMA interface. This enables both ASIC blocks to have access to the bus at the same time.

In the peer-to-peer DMA according to this embodiment, the initiating ASIC block does not require any additional logic to perform the peer-to-peer transfer and the target DMA does not require an additional slave interface to handle data transfers. Essentially, a slave-to-slave bridge is used to map the AHB master interface of the target DMA block to the target's AHB slave interface. The initiating block's DMA is held off by the target block's slave using a split response, described in the AHB specification, until the target block is set up and ready to complete the transfer.

More particularly, the target DMA is set up as if it is going to perform a normal DMA in the opposite direction as the initiating DMA. Unlike a standard DMA, which uses only the master interface for a data transfer, the AHB control signals and data signals for the target DMA block are routed from the target's AHB master interface to the target's slave interface using muxes that form a slave-to-slave bridge (peer-to-peer controller). This is done so that both DMA blocks think they have access to the bus, even though only one is actually being granted access from the system arbiter.

Figure 2:
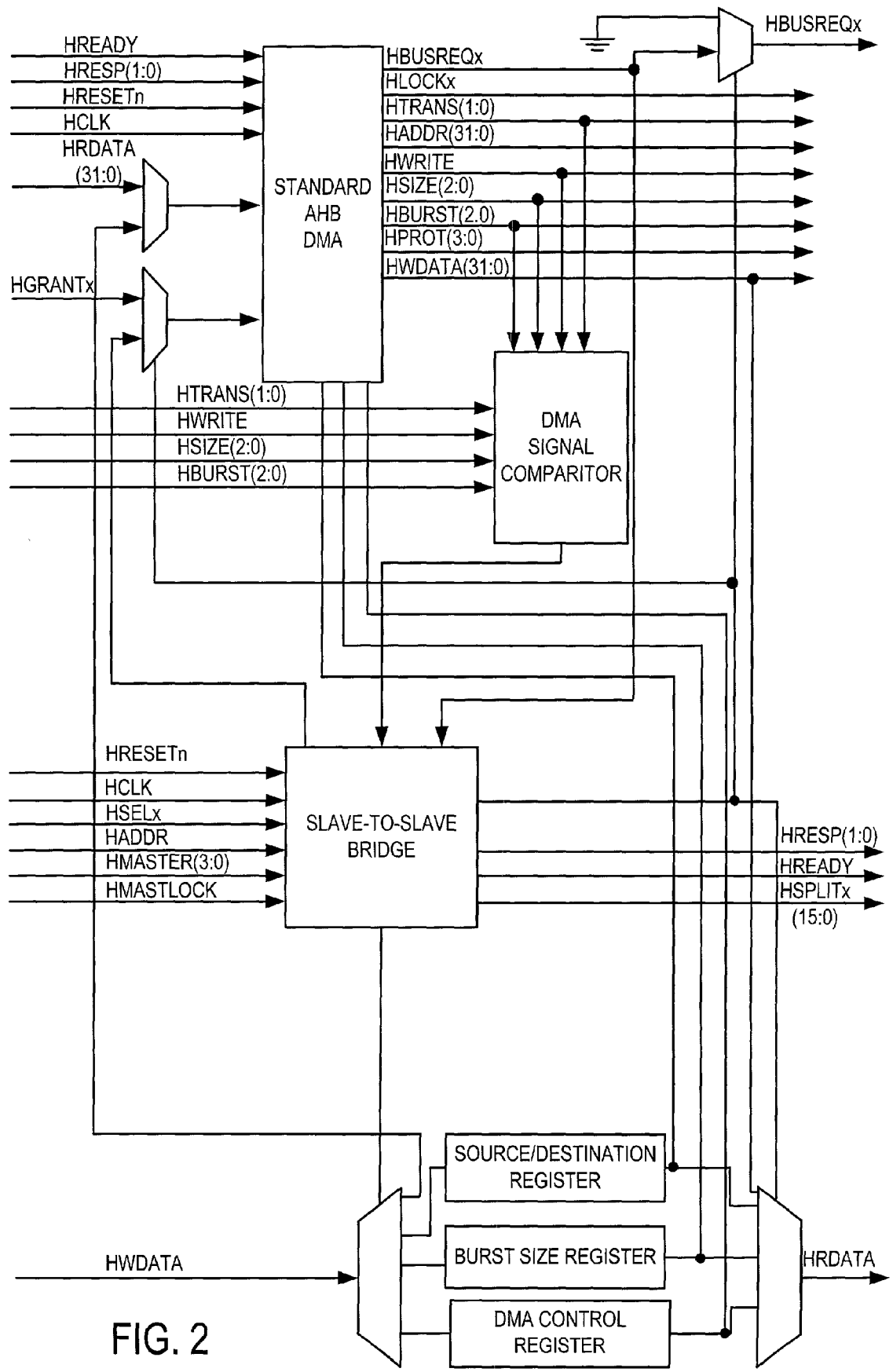
FIG. 2 is a schematic block diagram illustrating a peer-to-peer capable DMA ASIC block.

A high-level block diagram of a peer-to-peer capable DMA ASIC block is provided in FIG. 2. Referring to FIG. 2, an initiating DMA is set up normally as if it is going to read or write to a specific address. If this address is mapped to another DMA ASIC block, the second (target) ASIC block's slave interface recognizes that it is being accessed by another ASIC block and responds with a split response in the AHB bus architecture. The split response is used to hold off the initiating DMA until the target DMA is set up and ready to continue with the peer-to-peer data transfer.

The AHB bus architecture only allows a single master to be granted the bus at any given time. In order to perform a peer-to-peer DMA, however, both ASIC blocks need to have access to the bus. A target peer-to-peer DMA ASIC block uses internal logic to determine when it is being accessed by another DMA ASIC block. When the target block determines that it is being accessed by another DMA ASIC block, the bus request signal HBUSREQx and the bus grant signal HGRANTx of the target block are disconnected from the bus arbiter using muxes. The HBUSREQx signal is then used internally by the slave-to-slave bridge to determine when the target DMA is set up and ready to complete the previously split transfer. The HGRANTx signal is generated internally by the slave-to-slave bridge to make the target DMA ASIC block think that it has been granted the bus. The control signals coming out of the master interface of the target block are mapped to the slave control signals (HRESP[1:0], HREADY, SPLITx[15:0]) by the slave-to-slave bridge. The data is also mapped through the correct data bus on the slave interface depending on whether a read or write transfer is being performed.

Still referring to FIG. 2, the DMA ASIC block can further include a source/destination register, a burst size register, and a DMA control register. In addition, a read data mux is arranged at an input to the standard AHB DMA. Another read data mux is arranged to communicate with the source/destination register, burst size register, and DMA control register. A write data mux is also arranged to communicate with these registers. In summary, a DMA ASIC block according to a preferred embodiment of this invention includes a standard AHB DMA, a DMA signal comparator, an address decoder, a slave-to-slave bridge (peer-to-peer controller), and a plurality of muxes. A source/destination register, burst size register, and DMA control register are also provided. These components receive and process the signals supplied to the DMA ASIC block to enable the peer-to-peer DMA transfer.

Having described and illustrated the principles of the invention according to a preferred embodiment thereof, it should be apparent that the invention can be modified in arrangement and detail without departing from such principles. We claim all modifications and variations coming within the spirit and scope of the following claims.

What is claimed is:

1. A method of performing a peer-to-peer DMA to efficiently move data between a first DMA capable ASIC block and a second DMA capable ASIC block over an AHB bus architecture, said method comprising:
   initiating a DMA by setting up a first ASIC block to access a second ASIC block;
   holding off the DMA transfer until the second ASIC block is set up and ready for the transfer; and
   transferring data between the second ASIC block and the first ASIC block after the second ASIC block is set up and ready for the DMA transfer without accessing system memory.

2. A method according to claim 1, wherein the first ASIC block initiates the DMA by accessing a specific address that corresponds to the second ASIC block.

3. A method according to claim 1 wherein the second ASIC block is set up as if it is going to perform a DMA in the opposite direction as the first ASIC block.

4. A method according to claim 1, wherein holding off the DMA transfer comprises sending a split response until the second ASIC block is set up and ready to perform the DMA transfer.

5. A method according to claim 1, wherein the DMA transfer is performed without the use of sideband signals.

6. A method according to claim 1, wherein the DMA transfer is performed without duplicate hardware for interfacing core blocks on another side of the ASIC blocks.

7. A method of performing a peer-to-peer DMA to efficiently move data between a first DMA capable ASIC block and a second DMA capable ASIC block over an AHB bus architecture, said method comprising:
   initiating a DMA by setting up a first ASIC block to access a second ASIC block;
   holding off the DMA transfer until the second ASIC block is set up and ready for the transfer; and
   transferring data between the second ASIC block and the first ASIC block after the second ASIC block is set up and ready for the DMA transfer without accessing system memory,
   wherein a master interface of the first ASIC block is used to initiate the DMA transfer and to generate control signals and data signals for the second ASIC block, and wherein the control signals and data for the second ASIC block are routed through a slave interface of the second ASIC block.

8. A method according to claim 7, wherein signals of the second ASIC block are mapped from a master interface of the second ASIC block to the slave interface of the second ASIC block through muxes.

9. A method according to claim 7, wherein the DMA transfer takes place without accessing system memory.

10. A method of establishing a peer-to-peer DMA, comprising:
    initiating a peer-to-peer DMA from a first DMA capable ASIC block;
    setting up a second DMA capable ASIC block to communicate with the initiating ASIC block; and
    routing control and data signals between the second ASIC block and the first ASIC block without accessing system memory.

11. A method according to claim 10, wherein routing the control and data signals comprises routing the control and data signals through a slave interface using muxes.

12. A method according to claim 10, wherein each of the DMA capable ASIC blocks comprises a master interface configured to initiate reads and writes to the system memory and a slave interface configured to read and write registers that setup and run the DMA.

13. A method according to claim 10, wherein the second DMA capable ASIC block uses a split response to pause the DMA in the initiating ASIC block until the second block is ready to begin the transfer.

14. A method according to claim 10, wherein the initiating DMA capable ASIC block is set up as if it is going to read or write to a specific address.

15. A method of establishing a peer-to-peer DMA, comprising:
    initiating a peer-to-peer DMA from a first DMA capable ASIC block;
    setting up a second DMA capable ASIC block to communicate with the initiating ASIC block; and
    routing control and data signals between the second ASIC block and the first ASIC block without accessing system memory,
    wherein setting up the second DMA capable ASIC block to communicate with the initiating ASIC block comprises configuring the second ASIC block as if it is going to perform a normal DMA in an opposite direction as the initiating ASIC block.

16. A method of transferring data from a first DMA capable ASIC block to a second DMA capable ASIC block across a bus, the method comprising:
    mapping a slave interface of the first block to a master interface of the second block; and
    initiating a transfer of the data at the first logic block while holding off the transfer of the data at the second block until the second block is set up and ready to complete the transfer,
    wherein both the first block and the second block are set up as if they had been granted bus access even though only one block actually has access granted from a bus arbiter.

17. A method according to claim 16, wherein the transfer of data is held off by sending a split response until the second block is set up and ready to complete the transfer.

18. A method according to claim 16, wherein transfer of data between the first block and the second block takes place without accessing system memory.

19. A method according to claim 16, wherein the first block has bus access granted by the bus arbiter and wherein the second block uses internal logic to cause it to operate as if it has bus access.

* * * * *